Oct. 3, 1933.         C. S. FRANKLIN         1,929,241
TELEMETRIC SYSTEM
Filed July 7, 1927
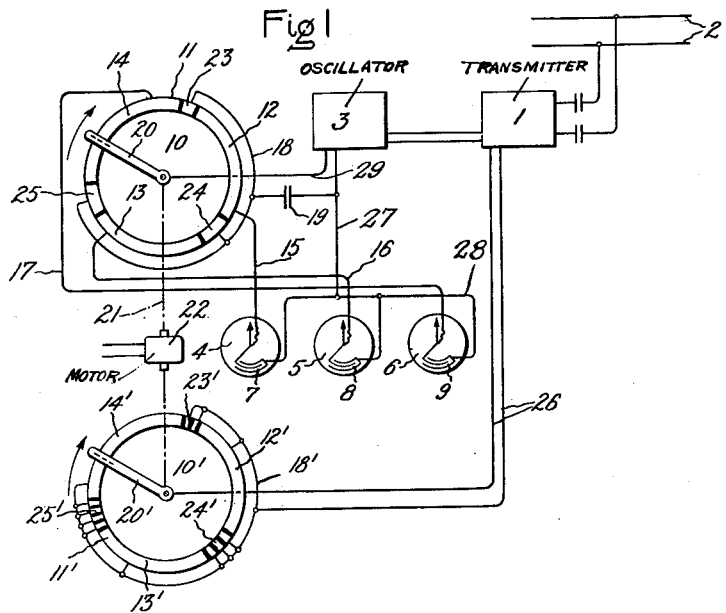
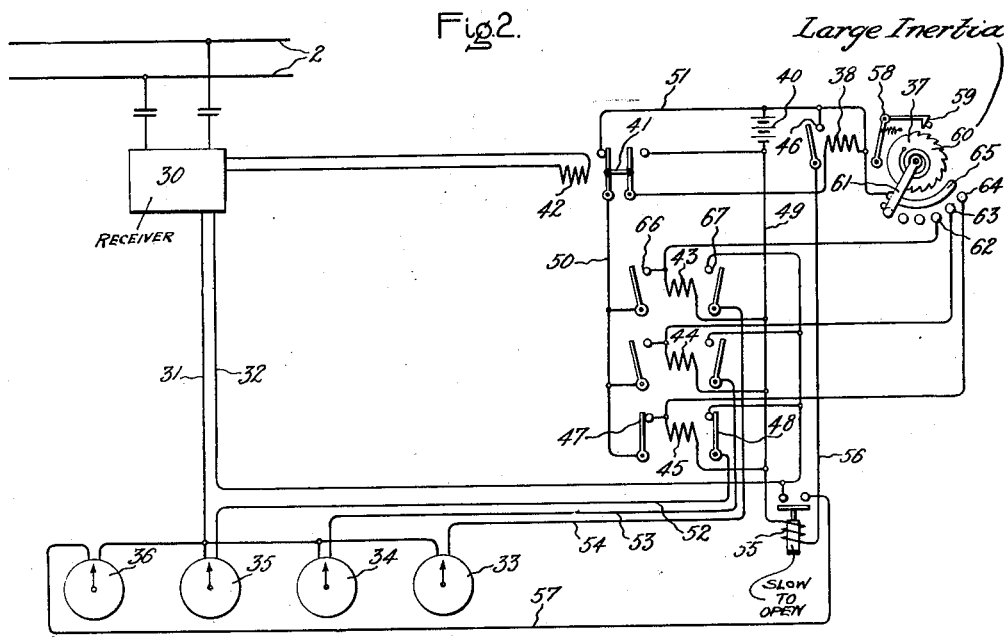
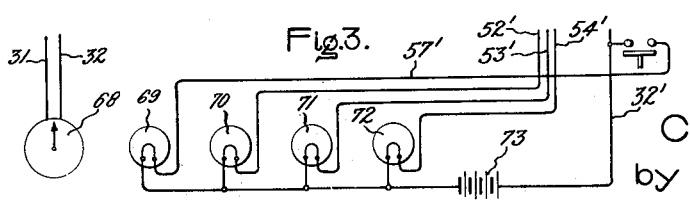
Inventor:
Charles S. Franklin,
by
His Attorney.

Patented Oct. 3, 1933

1,929,241

UNITED STATES PATENT OFFICE 1,929,241

TELEMETRIC SYSTEM

Charles S. Franklin, Schenectady, N. Y., assignor to General Electric Company, a corporation of New York Application July 7, 1927. Serial No. 204,100

8 Claims. (Cl. 177—351)

My invention relates to telemetric systems and more particularly to systems in which the readings of a plurality of meters may be successively indicated at a remote point. In a copending application Serial No. 194,468, of Alan S. FitzGerald, Filed May 26, 1927, Patent No. 1,849,870 granted March 15, 1932, Telemetric systems, and which is assigned to the same assignee as the present application, there is disclosed a system whereby the position of a movable element such as that of a meter may be indicated at a remote point through the medium of frequency variations in an alternating current source produced in accordance with the position of the movable element of the meter. These variable frequency alternating currents may be transmitted over wires to a frequency indicating means at a remote point or they may be caused to modulate a high frequency supply, currents from this supply being transmitted either by radio or over wire line conductors to a remote point where they are demodulated and caused to actuate a frequency indicating device.

The purpose of my invention is to provide means whereby a system of this kind, which employs only a single high frequency channel, may be employed to furnish remote indication of the position of a plurality of movable elements, or remote indication of the readings of a plurality of meters. In accordance with my invention I provide means whereby the frequency varying means which are associated with the movable element of, for example, a number of meters, the readings of which are to be remotely indicated, are successively connected in rotation to the alternating current source to control the frequency thereof. At the remote point I provide a plurality of indicating means responsive to frequency each of which corresponds to one of the above mentioned frequency varying means, and means whereby said indicating means are supplied in rotation with currents determined in frequency by a corresponding frequency varying means.

Another purpose of my invention is to provide, in a system of the type indicated, means whereby the accuracy of the adjustment of the frequency of the alternating current source may be periodically and automatically ascertained at the remote point. To this end I provide means whereby a frequency of predetermined value is periodically transmitted to an indicating means at the remote point the constancy of this frequency being an index of the accuracy of adjustment of the frequency of the alternating current source.

A further purpose of my invention is to provide means whereby the above result may be affected without the use of a separate source of synchronizing power for operation of the different connecting means.

Still another purpose of my invention is to provide a system of the type indicated which is economical in its construction, reliable in its operation and which is adapted for commercial telemetering by means of carrier currents transmitted over the conductors of the usual power distribution system.

The novel features which I believe to be characteristic of my invention will be set forth with particularity in the appended claims. My invention itself, however, both as to its organization and method of operation may best be understood by reference to the following description taken in connection with the accompanying drawing in which Fig. 1 illustrates a transmitting system employed in connection with my invention; Fig. 2 illustrates the receiving system; and Fig. 3 illustrates a modification of the receiving circuit.

With reference to Fig. 1 of the drawing, 1 represents a high frequency transmitting system such as is employed in connection with the usual radio or carrier current communication system, this system being adapted to supply high frequency currents through suitable coupling means to a radiating system or wire line circuit 2. 3 represents a source of alternating currents which preferably may consist of two oscillators the output of which are combined to produce a beat frequency in a manner fully set forth in the above mentioned copending application. The frequency of the currents produced by this source, as has also been set forth in the above mentioned application, is varied in accordance with the position of the movable element of the meters and over a range determined by the limits of movement of the movable element, and are caused to modulate the currents transmitted by the high frequency source 1 by means well-known in the art. This means may, for example, be of the type indicated in U. S. Patent No. 1,696,590, to Lester F. Bird, issued December 25, 1928. 4, 5, 6 represent meters, the readings of which are to be remotely indicated. Associated with each of these meters is a frequency varying means which may be in the form of a condenser 7, 8, 9, having a stationary plate and a movable plate, the latter of which is adapted to be varied in position with respect to the former in accordance with variations in the position of the movable element of the meter. The capacity of the condenser is, therefore, varied in accordance with the reading of the meter. These frequency varying means are adapted, in accordance with my invention, to be successively connected in rotation to the alternating current source 3 to vary the frequency thereof in a manner set forth in the above mentioned copending application.

10 represents a rotary switch which is made up of a ring 11 comprising a plurality of segments 12, 13 and 14 which correspond in number to the number of meters to be remotely indicated, and which are connected through conductors 15, 16 and 17 respectively to one of the plates of the meters 4, 5 and 6. These conducting segments are electrically insulated from each other and are separated by smaller segments 23, 24, 25. These smaller segments are connected together by means of a conductor 18 which is in turn connected to one of the plates of a fixed condenser 19. Cooperating with the conducting segments of the ring 11 is a rotating arm 20 mounted upon a shaft 21 which is rotated in the direction indicated by the arrow by a suitable motor 22. Also mounted upon the shaft 21 of the rotary switch 10 and motor 22 is a second rotary switch 10' of similar construction. All of the conducting segments of the ring of this switch are connected together by means of a conductor 18'. The ring of this switch is situated in position with respect to the position of the ring 10, such that the arms 20 and 20' of the two switches are simultaneously upon corresponding conducting segments of the two rings. The movable arm 20' and the conductor 18' of the rotary switch 10' are connected to opposite sides of a keying circuit 26 of the transmitter 1, the arrangement being such that when contact is broken between the arm 20' and any of the conducting segments of the ring 11', as by the arm passing over an insulating portion between the conducting segments, the operation of the transmitter will be interrupted, whereas when contact is made between the arm 20' and any of the conducting segments of the ring 11', the transmitter 1 will operate to supply high frequency currents to the line 2. One keying arrangement which may be employed is shown in U. S. Patent No. 1,698,706 to Irving F. Byrnes, issued January 8, 1929.

Those portions 23', 24', 25' of the ring 11' corresponding to the segments 23, 24, 25 of the ring 11 are divided into smaller insulated segments corresponding in number to the frequency varying means which is connected to the next succeeding segment 12, 13, 14 respectively. By this means as the arm 20 passes over these segments the output from the transmitter 1 is keyed in code in accordance with the frequency varying means next to be connected in rotation to the source 3. During this coding period the condenser 19 is connected to the source 3 to adjust the frequency thereof at a predetermined value such as that corresponding to the zero reading of the various meters.

It will thus be seen that when the rotary switches are in the position shown in the drawing a circuit is closed from one side from a conductor 27 leading from the alternating current source through conductor 28, condenser 9, conductor 17, segment 14, rotary arm 20 and conductor 29, also leading to the source 3, thereby connecting the condenser 9 to the source 3 in a manner to control the frequency thereof. Likewise as the arm 20 engages the segments 12 and 13 the condensers 7 and 8 will correspondingly be connected to the source 3. As the arm 20 engages any of the shorter segments 23, 24 or 25, the fixed condenser 19 will be connected to the source 3 for the purpose of transmitting a frequency of predetermined value depending upon the capacity of this condenser. This condenser preferably will be of a capacity equal to the capacity corresponding to that of the condensers 7, 8, 9 when the movable elements of the corresponding meters are upon their zero reading positions. Thus at times between the periods when the frequency determined by the condensers 7, 8 or 9 is being transmitted a frequency corresponding to a zero indication of these meters will be transmitted.

In Fig. 2 I have shown a circuit which I employ at the remote point. In this circuit 30 is a receiver which comprises the usual detector or demodulator of the high frequency currents transmitted by the transmitter 1, the input circuit of this detector being connected through suitable coupling means to the line conductors or receiving antenna 2. In the output circuit 31, 32 of this detector will appear currents having a frequency dependent upon the frequency of the source 3. 33, 34, 35 are frequency responsive means corresponding to the meters 4, 5, 6 respectively, and 36 is a frequency responsive means corresponding to the frequency adjusting device 19. Each of these meters is adapted to be connected to the output circuit of the detector 30 simultaneously with the connecting of the corresponding frequency control device in the transmitting system with the source 3. To accomplish this a selector switch 37 is provided which is operable responsively to interruptions in the high frequency supplied to the receiver 30 produced by the rotary switch 10' as its wiper 20' passes over the keying segments 23', 24', 25'. This selector switch is actuated by means of a coil 38 which is energized from a source of potential 40 during periods in which the high frequency supply is interrupted, this being effected by means of a switch 41 which is adapted to be retained in the position shown in the drawing when its actuating coil 42 is energized, as when high frequency currents are being received, and which is actuated to its opposite position when the high frequency supply is interrupted. One form of receiving means which may be employed is shown in U. S. Patent No. 1,522,581 to Lloyd E Spenschied, issued January 13, 1925. A plurality of relays 43, 44, 45 are adapted to be energized selectively by the selector switch 37 to connect the corresponding indicating means 33, 34, 35 to the output circuit of the receiver 30. Each of these relays is provided with a holding circuit such that when it has been energized it remains in its circuit closing position until the carrier current supplied to the receiver 30 has been interrupted or the arms 20 and 20' have passed over the ring segments during rotation. The coil 38 also has a pair of contacts 46 associated therewith for the purpose of connecting, through the intermediary of the relay 55, the "zero" frequency-responsive device 36 to the output circuit of the receiver 30, during the periods when the arm 20' of the rotary switch 10' is passing over the segments 23', 24', 25'.

A further understanding of my device may best be had by reference to the operation of the system. Assuming the apparatus in the position shown in the drawing, condenser 9 of the meter 6 is connected to the alternating current source 3, and high frequency currents modulated by currents of a frequency determined by the condenser 9 are being transmitted to the receiver 30 energizing relay coil 42 to hold switch contacts 41 in the position shown. The step coil 38 is deenergized, after having been previously operated to step the arm 61 around to 64 and to permit the latter to return to the position shown. The two pairs of contacts 47 and 48 of the relay 45 are in their closed position, the contacts 47 closing a holding circuit leading from one side of the source of potential 40 through the conductor 49, actuating coil of the relay 45, contacts 47, conductor 50, left-hand contacts of the switch 41, conductor 51 to the opposite side of the source of potential 40. The meter 35 is connected to the output circuit of the receiver through a circuit including conductor 31, conductor 52, contacts 48 and conductor 32.

As the arm 20' engages the first insulated portion in the group of segments 23' the carrier will be interrupted; thus relay 42 will be deenergized and the switch 41 will be actuated to close its right-hand contacts, thereby connecting the source of potential 40 across the actuating coil 38 of the relay 37 and interrupting the holding circuit of relay 45 which immediately opens its contacts. As the coil 38 is energized it closes the contacts 46, thereby energizing relay 55 through a circuit including source of potential 40, conductor 51, contacts 46, conductor 56, relay 55 and conductor 49. This relay will close its contacts thereby connecting indicating device 36 to the receiver through a circuit including conductor 31, conductor 57, contacts of the relay 55 and conductor 32. The armature 58 of selector 37 will also be actuated causing its pawl 59 to engage the first tooth of the disc 60, thereby causing the arm 61, which is attached to this disc, to be moved in a counter-clockwise direction sufficiently to engage its first contact. When the arm 20' engages the first conducting segment of the group 23' carrier current will again be supplied to the receiver 30 and the coil 42 will be energized, thereby actuating the switch 41 to the position shown in the drawing. In this position the coil 38 is deenergized and the contacts 46 are opened, thereby deenergizing the actuating coil of the relay 55. This latter relay, however, is slightly slow to open and will, therefore, remain in its closed position throughout the keying period. When the coil 38 is deenergized the armature 58 is actuated by a suitable bias spring out of engagement with the disc 60. The disc 60 has large inertia and does not immediately return to its initial position with the result that when the carrier current is again interrupted and the coil 38 is again energized the arm 61 will be actuated into engagement with its second contact at the right, this process being repeated for each of the interruptions corresponding to the segments 23', after which the arm 61 will have been actuated into engagement with the contact 62. At this time carrier current will be received during a long interval determined by the segments 12' and the coil 38 will be deenergized during a period sufficient to allow the armature 61 to return to its initial position under the influence of its biasing spring. While in engagement with the contact 62, however, a circuit is closed leading from one side of the source of potential 40 through conductor 51, stationary contact 65, arm 61, contact 62, actuating coil of the relay 43 and conductor 49 to the opposite side of the source of potential 40. The relay 43 closes its contacts 66 and 67, the former contact closing a holding circuit including the source of potential 40, conductor 49, actuating coil of the relay 43, contacts 66, conductor 50, left-hand contacts of the switch 41 and conductor 51; and the latter contact 67 connecting the meter 33 to the output circuit of the receiver 30 through a circuit including conductor 31, meter 33, conductor 54, contacts 67 and conductor 32. These connections will be retained, notwithstanding that the selector 37 returns to its initial position, by the contacts 66 and the left-hand contacts of the switch 41 until the carrier current is again interrupted by the arm 20' engaging the first insulated portion of the group of segments 24'.

The contacts of the relay 55 being slightly slow to open, retain the connection of the meter 36 to the output circuit of the receiver 30 during the entire keying period and for a small time interval after the last interruption during this period. As has been stated, the condenser 19 is connected to the source 3 and the frequency, which is being generated by the source 3, preferably corresponds in value to the zero reading of any of the meters 4, 5, 6. Thus it will be seen that the meter 36 and the frequency adjusting condenser 19 provide means for making a periodic check upon the zero readings of all the meters 33, 34, 35. Thus if this meter, which may be similarly constructed to the meters 33, 34, 35, does not read upon its zero position, or at a predetermined value, the operator will be informed that the meters 33, 34, 35 are not reading correctly and that an adjustment of the oscillatory circuits of the generator 3 is required. By arranging that this operation be effected during the keying period the number of segments in the ring 14 is reduced and a more frequent check is had than is otherwise practicable. It will also be noted that the connection of the meter 36 is retained for a short interval determined by the relay 55 after the previous interruption in the carrier current. Consequently for a short interval both meter 36 and one of the meters 33, 34, 35 are connected to the receiver 30 and the readings of these meters should agree with meter 36. By this means the accuracy of the meters 33, 34, 35 of themselves independently of the adjustment of the frequency determining circuits may be ascertained.

Since there is one more segment in the group 24' than in the group 23' when the arm 20' passes over this group the arm 61 will engage the contact 63 and the relay 44 will respond, thereby connecting meter 34 to the output circuit of the receiver 30, and likewise, when the arm 20' passes over the group of segments 25' the relay 45 will respond and the meter 35 will be connected to the output circuit of the receiver, etc. for as many meters as it is desired to employ.

In its preferred construction I arrange that the condensers 7, 8, 9 vary the frequency of the source 3 over ranges which are either wholly, or in part, coincident, at least one of the limits of the range being at a frequency common to all the meters. By arranging that the condenser 19 also adjusts the frequency of the source 3 at this limit, I provide a satisfactory means for determining the accuracy of either the zero or the maximum readings, as the case may be, of all the meters, although it will, of course, be understood that other relations between the condensers 19 and 7, 8, 9 may be employed as well. Likewise it may be desirable in a particular case to use separate fixed condensers one being connected to each of the segments 23, 24, 25.

In Fig. 3, I have shown a modification of the circuit shown in Fig. 2 in which only a single frequency meter 68 is employed, this meter being permanently connected to the receiver 30 through the conductors 31 and 32. To indicate which of the frequency varying means 7, 8, 9 or frequency adjusting means 19, the meter 68 is responding to, indicating means comprising lamps 69, 70, 71, 72 are provided, these lamps being energized from the source 73 through a circuit including conductor 32' through the right-hand contacts of any of the relays 43, 44, 45, (Fig. 2) and conductors 52', 53', 54', (Fig. 3) to the respective indicating device 70, 71, 72, or during the keying period through the conductor 32', contacts of the relay 55 (Fig. 2) conductor 57' and the lamp 69. The operation of the remaining portion of the circuit is the same as in Fig. 2.

It will thus be seen that I have provided means whereby corresponding frequency varying means and frequency indicating means are successively connected respectively to the source 3 and the receiver 30 in rotation, and this without the use of any independent synchronizing power. I have also provided a means periodically ascertaining the accuracy of the readings of the meters 33, 34 and 35 per se, and also upon these readings as they may be affected by changes in the constants of the frequency determining circuits of the source 3.

While I have shown and described a particular embodiment of my invention it will, of course, be understood that I do not wish to be limited thereto since many modifications, both in the circuit arrangement and in the instrumentalities employed may be made without departing from the spirit and scope of my invention as set forth in the appended claims.

What I claim as new and desire to secure by Letters Patent of the United States, is:—

1. In a telemetric system, the combination with a source of alternating currents, of a plurality of movable elements, each of said elements having means associated therewith for varying the frequency of said source in accordance with the position of the element, a fixed means for determining the frequency of said source, means for connecting each of said first means in rotation to said source to control the frequency thereof and for periodically connecting said fixed means thereto, frequency responsive means corresponding to each of said movable elements and to said fixed means and means for supplying to each of said frequency responsive means current having its frequency determined by the fixed means or movable element corresponding thereto.

2. In a telemetric system, a source of alternating currents of variable frequency, a plurality of movable elements each of said movable elements being provided with means for varying the frequency of said source over a range determined by the limits of movement of said movable element at least one limit of the range determined by each of said movable elements being at a common frequency, a fixed means for adjusting the frequency of said source at said common frequency, means for connecting each of said frequency varying means in rotation to said source to control the frequency thereof and for periodically connecting said fixed means to said source, frequency responsive means corresponding to each of said movable elements and to said fixed means and means for supplying to each of said frequency responsive means currents having a frequency determined by the movable element or fixed means corresponding thereto.

3. In a telemetric system, a transmitter of high frequency currents, a source of modulating currents associated therewith, a detector for said currents, a plurality of movable elements each of said movable elements being provided with means for varying the frequency of said source, a plurality of frequency responsive means each of said responsive means corresponding to one of said movable elements, a fixed means for determining the frequency of said source and frequency responsive means corresponding thereto, means for connecting each of said frequency varying means in rotation to said modulating current source to control the frequency thereof and for periodically connecting said fixed means to said source and means for simultaneously connecting corresponding frequency responsive means to said detector.

4. In a telemetric system, a transmitter of high frequency currents, a source of modulating currents associated therewith, a detector for said currents, a plurality of movable elments each of said movable elments being provided with means for varying the frequency of said source, a plurality of frequency responsive means each of said responsive means corresponding to one of said movable elemnts, a fixed means for determining the frequency of said source and frequency responsive means corresponding thereto, means for connecting each of said frequency varying means in rotation to said modulating current source to control the frequency thereof, means for keying the output from said transmitter in code in accordance with the frequency varying means next to be connected to said source and for connecting said fixed means to said source during said keying period, means responsive to said code for simultaneously connecting corresponding frequency responsive means to said detector, and means for connecting said responsive means corresponding to said fixed means to said detector during said keying period.

5. In a telemetric system, a carrier current transmitter and receiver, a source of modulating currents for said transmitter, a plurality of variable means for controlling the frequency of said source, a plurality of frequency responsive means, each of said responsive means corresponding to one of said variable means, and means for simultaneously connecting each of said variable means and a corresponding frequency responsive means in rotation respectively to said transmitter and receiver, said means including means for producing interruptions in said carrier in code determined in character in accordance with the variable means next to be connected to said source, selecting means operable responsively to said interruptions, and a plurality of means each responsive to said selecting means to connect one of said frequency responsive means to said receiver and to retain said connection independently of said selecting means.

6. In a telemetric system, a source of alternating currents of variable frequency, a plurality of means for varying the frequency of said source, a plurality of frequency responsive means each of said responsive means corresponding to one of said frequency varying means, a fixed means for determining the frequency of said source and frequency responsive means corresponding thereto, means for impressing upon conductors at a remote point currents determined in frequency in accordance with said source, means for connecting each of said frequency varying means in rotation to said source to vary the frequency thereof, for interrupting the currents on said conductors in code determined in character in accordance with the frequency varying means next to be connected to said source and for connecting said fixed means to said source during said keying period and means responsive to said interruptions for simultaneously connecting to said conductors frequency responsive means corresponding to said fixed or varying means.

7. In combination, an oscillation generator, a plurality of measuring devices, a plurality of tuning elements for said oscillation generator, means for controlling each of said tuning elements by one of said measuring devices, a fixed tuning element for said generator, means for automatically connecting each of said elements in succession to said generator, a plurality of frequency responsive indicating means, each of said indicating means corresponding to one of said elements, and means for supplying current having frequency dependent upon the frequency of said generator to each of said indicating means when the corresponding element is connected to said generator.

8. In combination, an oscillation generator, a plurality of indicating devices, a plurality of means for varying the frequency of said oscillation generator, means for varying each of said frequency varying means in accordance with the indication given by a corresponding indicating device, means for connecting each of said frequency varying means in rotation to said generator, a plurality of frequency responsive indicating means, each of said indicating means corresponding to one of said frequency varying means, means for supplying current having frequency determined by said generator to each of said indicating means in rotation synchronously with the connection of said frequency varying means to said generator, a fixed means for controlling the frequency of said generator, means for automatically connecting said fixed means to said generator at least once in said rotation, and means for indicating the frequency produced when said fixed means is connected.

CHARLES S. FRANKLIN.